United States Patent
Yap et al.

(10) Patent No.: US 10,216,744 B2
(45) Date of Patent: Feb. 26, 2019

(54) DATA MIGRATION TO A CLOUD COMPUTING SYSTEM

(71) Applicant: Microsoft Technology Licensing, LLC, Redmond, WA (US)

(72) Inventors: Joe Keng Yap, Sammamish, WA (US); Mahadevan Thangaraju, Sammamish, WA (US); Sean L. Livingston, Bothell, WA (US); Roberta Cannerozzi, Bellevue, WA (US); Ghania Moussa, Issaquah, WA (US); Ron Shimon Estrin, Bellevue, WA (US); Yu-Ting Lin, Redmond, WA (US); Simon Bourdages, Redmond, WA (US); Trung Duc Nguyen, Bellevue, WA (US); Wenyu Cai, Redmond, WA (US); Zachary Adam Koehne, Redmond, WA (US); Patrick J. Simek, Redmond, WA (US); Sukhvinder Singh Gulati, Redmond, WA (US); Ben Canning, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 713 days.

(21) Appl. No.: 14/854,798

(22) Filed: Sep. 15, 2015

(65) Prior Publication Data

US 2016/0321275 A1 Nov. 3, 2016

Related U.S. Application Data

(60) Provisional application No. 62/155,735, filed on May 1, 2015.

(51) Int. Cl.
*G06F 17/30* (2006.01)
*G06F 9/48* (2006.01)

(52) U.S. Cl.
CPC ...... *G06F 17/30079* (2013.01); *G06F 9/4856* (2013.01); *G06F 17/30368* (2013.01)

(58) Field of Classification Search
None
See application file for complete search history.

(56) References Cited

U.S. PATENT DOCUMENTS

| 9,753,802 B1* | 9/2017 | Shipilov | G06F 11/1004 |
| 2006/0026195 A1* | 2/2006 | Gu | H04L 41/0846 |

(Continued)

FOREIGN PATENT DOCUMENTS

| EP | 2 728 428 A1 | 5/2014 |
| WO | 2015021331 A2 | 2/2015 |

OTHER PUBLICATIONS

International Search Report and Written Opinion for International Patent Application No. PCT/US2016/029910, dated Jul. 4, 2016, date of filing: Apr. 29, 2016, 13 pages.

(Continued)

*Primary Examiner* — Richard L Bowen
(74) *Attorney, Agent, or Firm* — Christopher J. Volkmann; Kelly, Holt & Christenson, PLLC

(57) ABSTRACT

A cloud-based migration system exposes a source-independent application programming interface for receiving data to be migrated. The data is uploaded and stored as a single entity in a cloud-based storage system. A migration system then accesses the migration package and begins migrating the data to its destination, from the cloud-based storage system.

20 Claims, 13 Drawing Sheets

(56) References Cited

U.S. PATENT DOCUMENTS

| | | | |
|---|---|---|---|
| 2009/0307695 A1 | 12/2009 | Chandnani | |
| 2009/0310767 A1* | 12/2009 | Wang | H04M 3/42144 379/201.02 |
| 2010/0153341 A1* | 6/2010 | Driesen | G06F 17/303 707/661 |
| 2011/0289064 A1 | 11/2011 | Johnson | |
| 2012/0221845 A1 | 8/2012 | Ferris | |
| 2013/0031342 A1* | 1/2013 | French | G06F 9/4418 713/2 |
| 2013/0117289 A1 | 5/2013 | Fischer et al. | |
| 2013/0204849 A1 | 8/2013 | Chacko | |
| 2013/0247068 A1* | 9/2013 | Min | G06F 9/5088 718/105 |
| 2014/0082479 A1 | 3/2014 | Guinane | |
| 2015/0058289 A1* | 2/2015 | Do | G06F 17/303 707/613 |
| 2015/0242234 A1* | 8/2015 | Harris | G06F 9/5011 718/1 |
| 2015/0281319 A1* | 10/2015 | Maturana | G06F 9/5072 709/202 |
| 2016/0269313 A1* | 9/2016 | Brooker | G06F 9/5072 |

OTHER PUBLICATIONS

Tudoran et al., "Bridging Data in the Clouds: An Environment-Aware System for Geographically Distributed Data Transfers", 2014 14th IEEE/ACM International Symposium on Cluster, Cloud and Grid Computing, IEEE, May 26, 2014, 10 pages.

Monti et al., "CATCH: A Cloud-based Adaptive Data Transfer Service for HPC", Parallel & Distributed Processing Symposium (IPDPS), 2011 IEEE International, IEEE, May 16, 2011, 12 pages.

Calder et al., "Windows Azure Storage: A Highly Available Cloud Storage Service with Strong Consistency", Operating Systems Principles, ACM, Oct. 23, 2011, 15 pages.

Sakr et al., "A Survey of Large Scale Data Management Approaches in Cloud Enviornments", IEEE Communications Surveys and Tutorials, Institute of Electrical and Electronics Engineers, Jul. 1, 2011, 26 pages.

"Content Migrator", Retrieved on: Apr. 13, 2015 Available at: http://www.fishbowlsolutions.com/StellentSolutions/StellentComponents/ContentMigratorforOracleUCMStellent/index.htm.

"Migration Suite for SharePoint 4.6—User Guide", Retrieved on: Apr. 13, 2015 Available at: http://documents.software.dell.com/doc150698.

"Migration Solutions to Other ECM", Published on: Dec. 18, 2013 Available at: http://www.proventeq.com/migration-to-other-ecm.

"Migration Center—First in Migration Technology", Published on: May 16, 2014 Available at: http://www.migration-center.com/product/outstanding-content-migration-capabilities/.

Kerr, Luis, "Content Migration Tools for SharePoint", Published on: Mar. 27, 2010 Available at: http://www.topsharepoint.com/content-migration-tools-for-sharepoint.

"SharePoint Content Deployment Wizard", Published on: Mar. 2, 2009 Available at: https://spdeploymentwizard.codeplex.com/.

Mikeryan, "Drupal". Published on: Mar. 4, 2009 Available at: https://www.drupal.org/project/migrate Migrate.

"Tzunami Deployer for File Shares Migration", Retrieved on: Apr. 13, 2015 Available at: http://www.tzunami.com/products/td-file-shares-migration/.

"Content Migration Overview", Published on: Dec. 7, 2013 Available at: https://msdn.microsoft.com/en-us/library/office/ms453426(v=office.14).aspx.

* cited by examiner

DATA MIGRATION TO A CLOUD COMPUTING SYSTEM

CROSS-REFERENCE TO RELATED APPLICATION

The present application is based on and claims the benefit of U.S. provisional patent application Ser. No. 62/155,735, filed May 1, 2015, the content of which is hereby incorporated by reference in its entirety.

BACKGROUND

Computing systems are currently in wide use. Some computing systems are local, in that they are used generally at a location where end users reside. Other computing systems are deployed in remote-server environments, such as in cloud computing architectures.

Some organizations use relatively large computing systems initially in an on-premise, or local architecture. However, it may be that such organizations wish to migrate data and other components of the computing system (either the entire on-premise computing system, or parts of it) to a remote server environment, such as to a cloud computing architecture.

The content to be migrated to the cloud can originate from various sources, and have different forms. Some migration systems in the cloud expose an application programming interface (or API) that is called, with content, for migration. In current systems, an API call needs to be made for each object to be migrated, and for each version or source.

Cloud migration systems also often serve a number of different organizations. When an organization is attempting to migrate a relatively large amount of data to the cloud, this can adversely affect the performance provided to other organizations. For instance, the data ingestion rate of the cloud migration system may be limited, so that when one organization makes a relatively large migration call, this can slow down the performance of the system for other organizations.

Further, data to be migrated is often loaded directly into the migration system. By way of example, a set of on-premise migration content can be generated, that may be relatively large. That set of content is then often uploaded directly into the migration system in the cloud. If the migration of any item of that particular set of content fails, then the entire set of content needs to be re-uploaded to the cloud-based migration system, from the on-premise system.

The discussion above is merely provided for general background information and is not intended to be used as an aid in determining the scope of the claimed subject matter.

SUMMARY

A cloud-based migration system exposes a source-independent application programming interface for receiving data to be migrated. The data is uploaded and stored as a single entity in a cloud-based storage system. A migration system then accesses the migration package and begins migrating the data to its destination, from the cloud-based storage system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
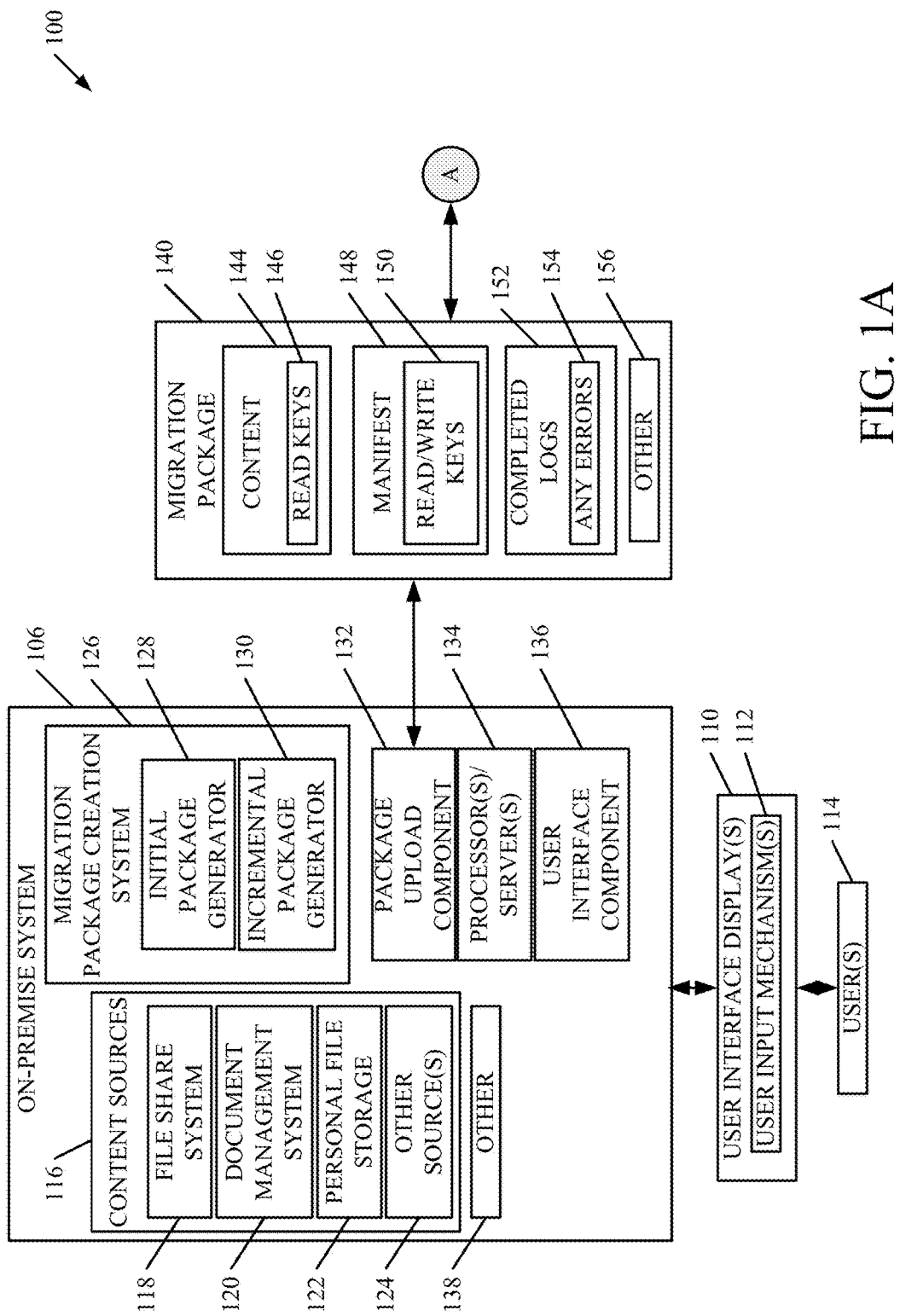
FIGS. 1A and 1B (collectively referred to as FIG. 1) show a block diagram of one example of a migration architecture.
Figure 1B:
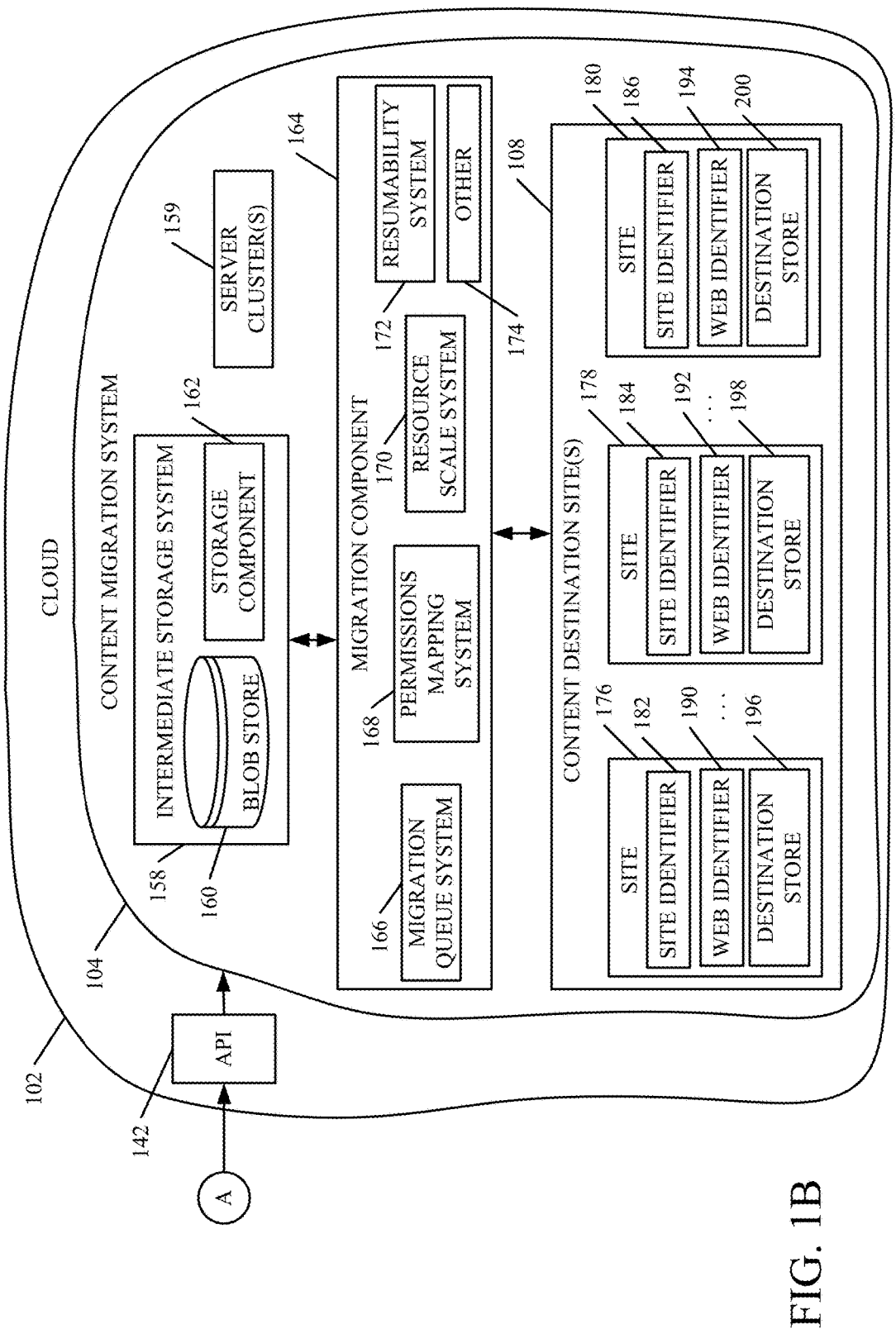

FIGS. 1A and 1B (collectively referred to as FIG. 1) show a block diagram of one example of a migration architecture 100. Migration architecture 100 illustratively includes a cloud architecture 102 that includes a cloud-based content migration system 104 that migrates data from an on-premise system 106 to one or more content destination sites 108. On-premise system 106 illustratively generates user interface displays 110, with user input mechanisms 112 for interaction by end users 114. It will be noted that users 114 can be one or more administrators as well. In any case, users 114 illustratively interact with user input mechanisms 112 in order to control and manipulate on-premise system 106.

On-premise system 106 illustratively includes a set of content sources 116. For instance, they can include a file share system 118, document management system 120, personal file data store 122, or a variety of other sources 124. On-premise system 106 also illustratively includes migration package creation system 126 (which, itself, illustratively includes initial package generator 128 and incremental package generator 130), package upload component 132, a set of processors or servers 134, user interface component 136, and it can include other items 138. In order to migrate data from content sources 116 to content destination sites 108, an administrator first uses migration package creation system 126 to create a migration package 140. It then uses package upload component 132 to upload migration package 140, through a source-independent application programming interface (or API) 142, exposed by content migration system 104. In one example, migration package 140 includes content 144 that has not only content, but a set of read keys 146, a manifest 148 that has a listing or other records of the items of content 144 that are to be migrated, along with a set of read/write keys 150. As is described in greater detail below, content migration system 104 also illustratively places a set of completed logs 152 in migration package 140 (and it can be within manifest 148). Logs 152 identify the completion status of the migration of various objects identified in manifest 148 to the content destination sites 108. It can also include any errors 154 that occurred during the migration. Migration package 140 can include other items 156 as well.

In the example shown in FIG. 1, content migration system 104 illustratively includes an intermediate storage system 158, which can include a binary large object (blob) store 160 and storage component 162 which allows other components to store information in blob store 160 and retrieve it therefrom. In one example, blob store 160 stores migration packages as a collection of binary data stored as a single entity in a database management system. It can also, in some examples, store binary executable code as well.

Content migration system 104 can also illustratively include migration component 164 that has a migration queue system 166 that manages various queues during migration, a permissions mapping system 168 that maps permissions from entities in on-premise system 106 to those same entities in content destination sites 108. Component 164 can include a resource scale system 170 that scales the various resources (e.g., virtual machines and storage) used by migration component 164, based upon the workload of items to be migrated in intermediate storage system 158. Component 164 can also include a resumability system 172 that performs resumability processing so that, if a migration job fails in mid-course, it need not begin again from the first object to be migrated, but can skip all or some of the objects that have were successfully migrated, before the job failed. Component 164 can of course include other items 174 as well.

Content destination sites 108 can include a set of sites 176-180. Each site illustratively includes a site identifier 182, 184 and 186, respectively, as well as a web identifier 190, 192 and 194, respectively. Each site also illustratively includes its own destination store 196, 198 and 200.

Figure 2:
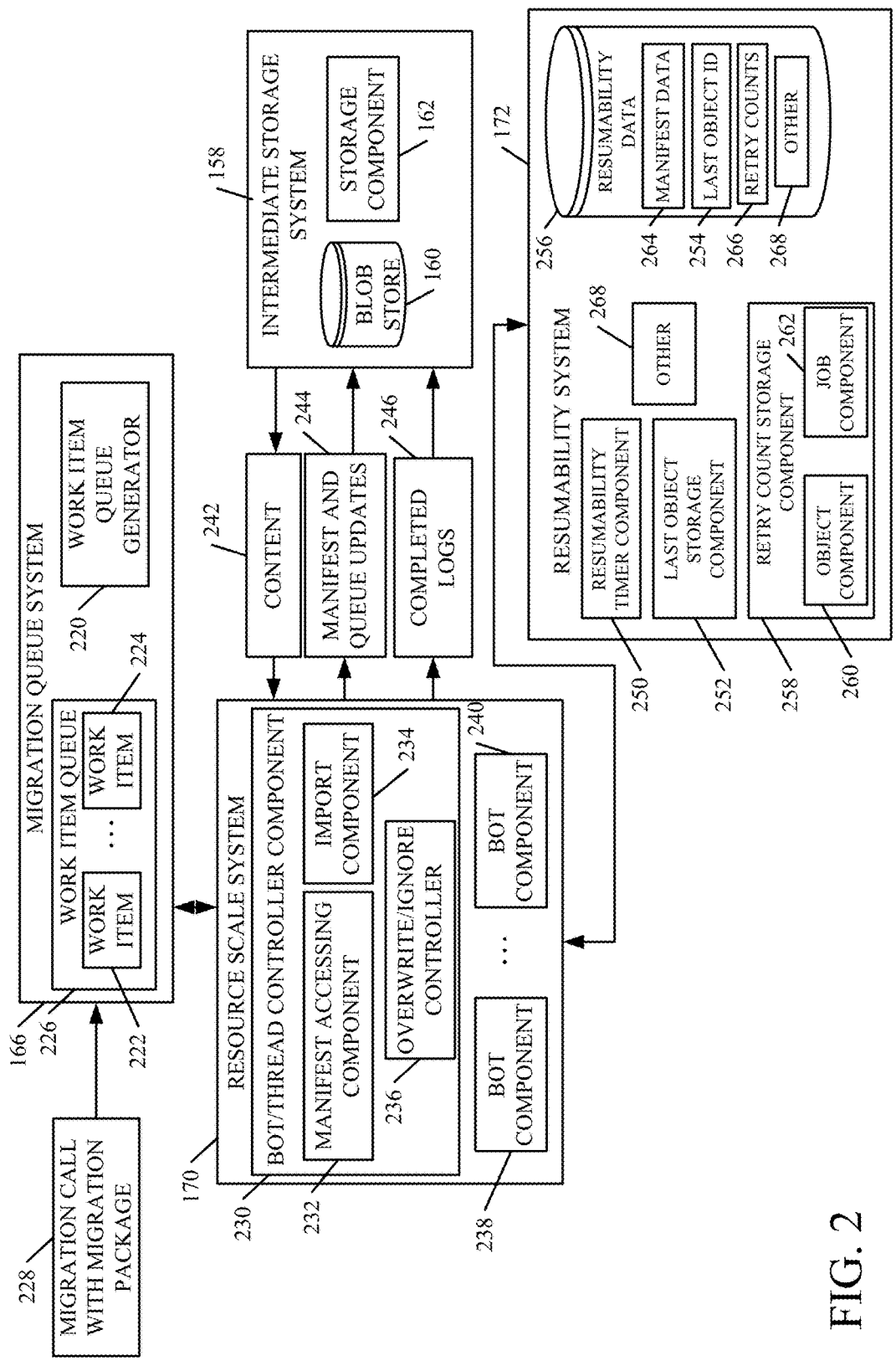
FIG. 2 is a block diagram of a portion of the migration architecture shown in FIG. 1, in more detail.

FIG. 2 is a block diagram with portions of content migration system 104 illustrated in more detail. FIG. 2, for instance, shows that migration queue system 166 includes a work item queue generator 220 that generates work items 222-224 in a work item queue 226, based upon migration calls that are sent from on-premise system 106 (or other systems calling for migration) that include migration packages 140. The migration call is indicated by block 228 in FIG. 2.

FIG. 2 also shows that, in one example, resource scale system 170 includes a bot/thread control component 230 that, itself, includes a manifest accessing component 232, an object import component 234 and overwrite/ignore controller 236. Manifest accessing component 232 accesses the manifest in the migration package corresponding to a selected work item 222. It identifies the next object to be imported, and import component 234 begins the import process. Bot/thread control component 230 also controls a number of bots 238-240 that are performing import processing. Each bot can be performing on multiple different threads, and component 230 controls the thread number and the number of bots 238-240 to scale (e.g., increase or decrease) based upon the workload (e.g., the number of work items 222-224 in work item queue 226). As will be described in greater detail below, overwrite/ignore controller 236 is used during the resumability processing.

FIG. 2 also shows that the import component 234 obtains content 242 from a migration package that is being migrated. Manifest accessing component 232 also writes manifest updates and queue updates 234 into the corresponding manifest. The bot/thread control component 230 also illustratively writes completed log information 246 into the manifests (or at another location accessible by the administrator who called for the migration) as well.

FIG. 2 also illustrates that in one example, resumability system 172 includes resumability timer component 250. Timer component 250 can be set so that system 172 intermittently performs resumability processing. Last object storage component 252 intermittently stores the identity of a last object ID 254 in resumability data store 256. The ID 254 identifies the last object that was retrieved from the migration package when resumability processing begins. Retry count storage component 258 illustratively includes an object component 260 and a job component 262. Object component 260 keeps track of the number of times an object migration has been attempted for each object. Job component 262 keeps track of the number of times a given job has been attempted. Resumability data store 256 can also include manifest data 264 and the retry counts 266 generated by components 260 and 262. These will all be described in greater detail below with respect to FIG. 4. Resumability system 172 can include other items 268 as well.

Figure 3:
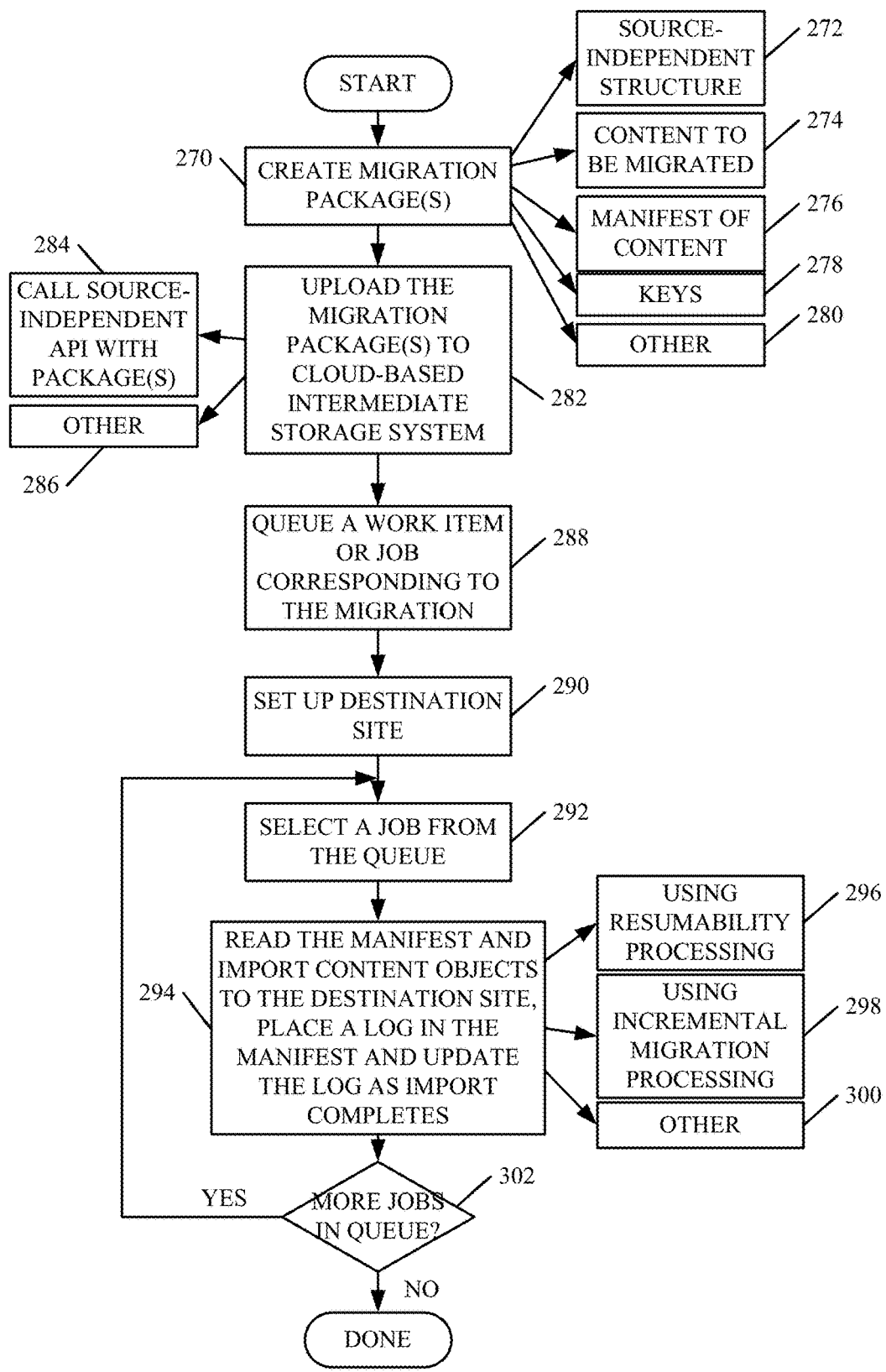
FIG. 3 is a flow diagram illustrating one example of the overall operation of the migration architecture shown in FIG. 1, in migrating data to a cloud-based destination.

FIG. 3 is a flow diagram illustrating one example of the overall operation of migration architecture 100 in migrating data from on-premise system 106 to content destination sites 108. Migration package creation system 126 first creates one or more migration packages with content from the various content sources 116 to be migrated. This is indicated by block 270 in FIG. 3. In one example, where the migration is just being initiated for the first time, initial package generator 128 creates the migration package. Each package is illustratively created according to a source-independent structure 272. Each package illustratively includes content to be migrated 274, a manifest (or listing) of that content 276 and a set of keys 278. It can include other items 280 as well.

Keys 278 illustratively allow the migration system to only read the content, but to read and write to the manifest. This is so that the system can write import status updates, errors, etc., to the manifest so that the administrator who initiated the migration can check on the status.

Package upload component 132 then uploads the migration package (or packages) to the cloud-based intermediate storage system 158. This is indicated by block 282. It can do this by making a single call to the source-independent API 142, and including the various migration packages. This is indicated by block 284. Storage component 162 then stores the package, as a blob, in blob store 160. The upload can be performed in other ways as well, and this is indicated by block 286. Work item queue generator 220 (FIG. 2) then queues a work item or job 222-224 corresponding to the requested migration. This is indicated by block 288. Bot/thread control component 230 then sets up the content destination sites 108 for the content to be migrated. In doing so, it can provide the site identifier 182, web identifier 190, and provision a destination store 196. Setting up the destination site is indicated by block 290.

Bot/thread component 230 then selects a job 222-224 from the work item queue 226. This is indicated by block 292.

Manifest accessing component 232 reads the manifest to identify a first (or next) content object to be imported Import component 234 then imports that content object to the destination site 108. Component 230 then places a log in the corresponding manifest and updates the log as the import completes. This is indicated by block 294. As is described below with respect to FIG. 4, this can be done while resumability system 172 performs resumability processing so that, if the job fails, it can be resumed from approximately where it failed. Using resumability processing is indicated by block 296.

Also, in one example, the migration may be performed incrementally. This is described in greater detail below with respect to FIGS. 5 and 6. Using incremental migration processing is indicated by block 298. Migrating objects can be performed in other ways, or include other steps as well, and this is indicated by block 300.

Once the objects identified in the manifest have all been imported (or migrated) to their destination sites, bot/thread control component 230 determines whether there are any more jobs in work item queue 226. This is indicated by block 302. If so, processing reverts to block 292 where another job is selected and import begins again for that job.

Figure 4A:
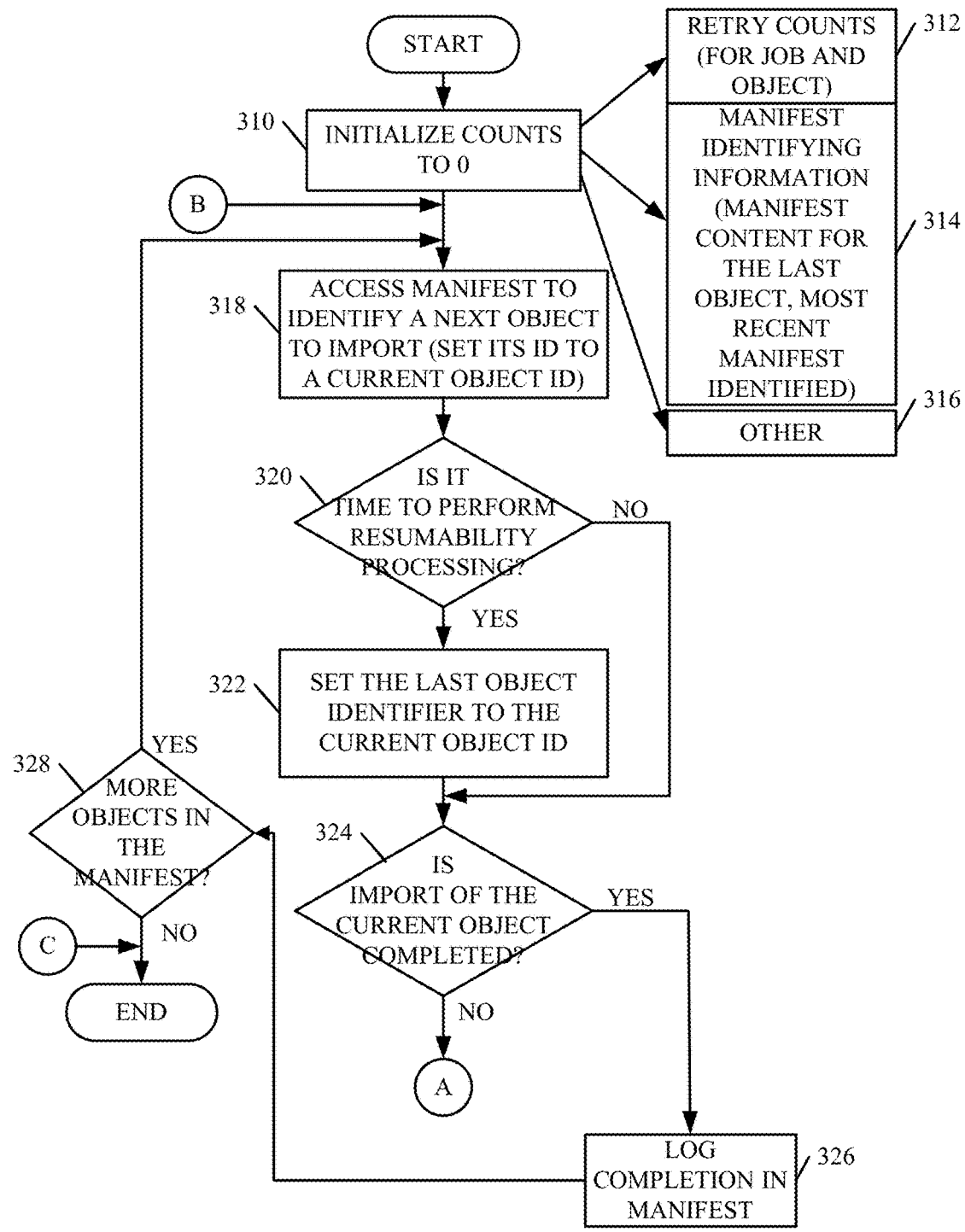
FIGS. 4A and 4B (collectively referred to as FIG. 4) illustrate one example of the operation of the architecture shown in FIG. 1, in performing resumability processing during data migration.
Figure 4B:
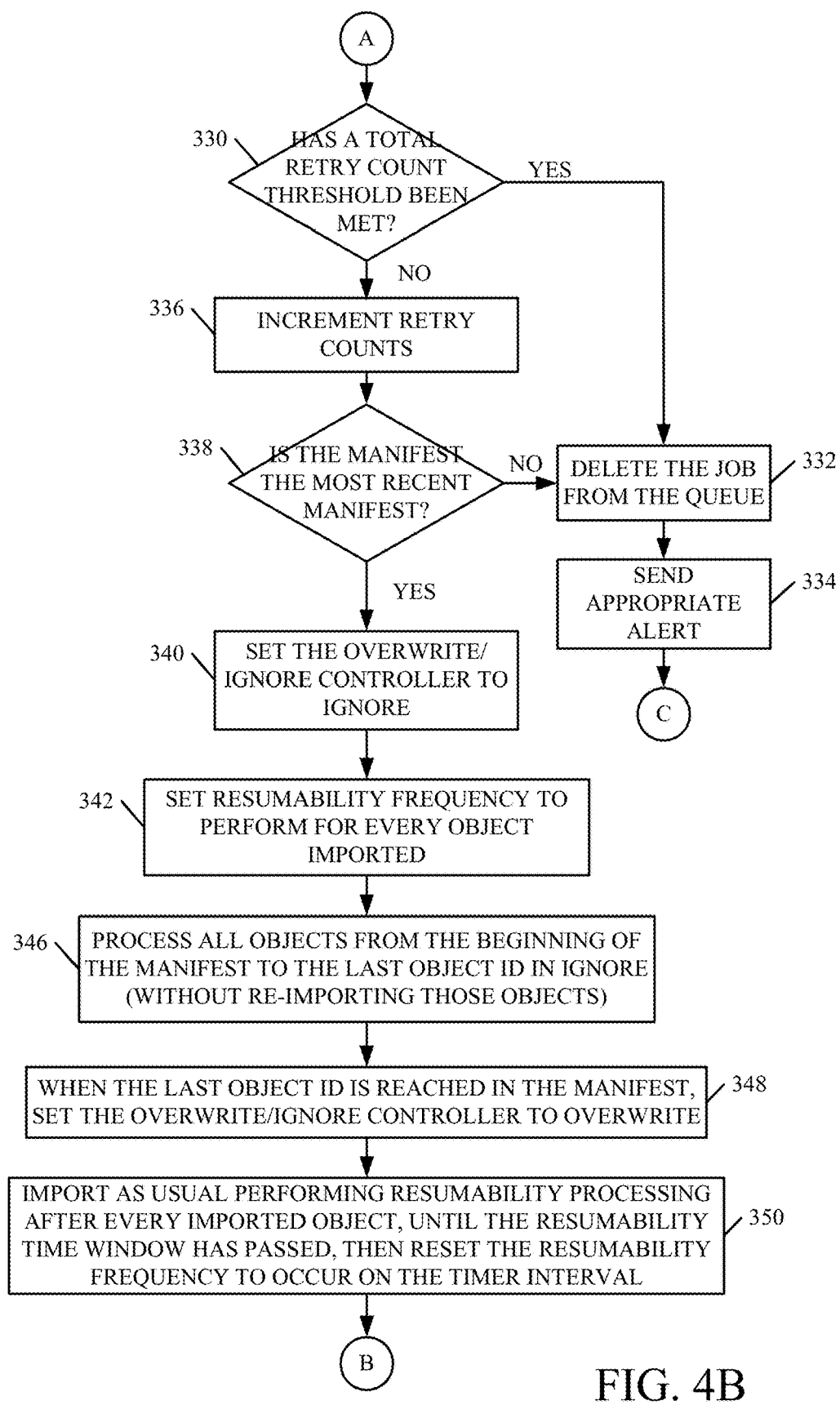

FIGS. 4A and 4B (collectively referred to as FIG. 4) illustrate a flow diagram showing how migration can be performed with resumability processing. For purposes of the description of FIG. 4, it is assumed that a migration package has already been received and stored in blob store 160. Retry count storage component 258 (and object component 260 and job component 262) initialize all of the counts to zero. This is indicated by block 310 in FIG. 4. That is, the job retry counts and object retry counts are all set to zero as indicated by block 312. In addition, the manifest data 264 in data store 256 is reset as well. By way of example, that data may include the manifest content for the last object imported, and an identifier for the most recent manifest that was received. This is indicated by block 314. Initialization can include other steps as well, and this is indicated by block 316.

Last object storage component 252 then accesses the manifest to identify a next object that is to be imported by the import component 234 for this migration job. The identifier of that object is set to a current object ID (which indicates the current object being imported). This is indicated by block 318.

In one example, resumability timer component 250 is set so that resumability processing is performed periodically, based upon the time value of the timer. By way of example, timer component 250 may be set to perform resumability processing once every minute. In that case, each minute, component 252 stores the ID of the current object being imported, so if the migration fails, the system will know, to within a minute (or other interval of timer 250), which objects have already been imported to the destination site. Therefore, if, as indicated at block 320, it is time to perform resumability processing, then last object storage component 252 updates the last object ID 254 in data store 256 to the current object ID. This is indicated by block 322. Import component 234 continues to import the current object.

If the import of the current object completes successfully, as indicated by block 324, then control component 230 logs the completion in the corresponding manifest. This is indicated by block 326. Manifest accessing component 232 then determines whether there are more objects in the manifest to import. This is indicated by block 328. If so, processing reverts to block 318 where the next object to import is identified, etc.

If, at block 324, it is determined that the job has aborted or somehow failed, so that import of the current object was not completed successfully, then retry count storage component 258 determines whether a total retry count threshold has been reached for either the current object, or the current job. This is indicated by block 330. If so, the job is deleted from the work item queue 226, as indicated by block 332, and an appropriate alert is sent to the administrator that requested the migration, as indicated by block 334.

However, if, at block 330, it is determined that the total retry count threshold has not been met (either for the job or for this object), then the retry counters are both incremented (both for this job and for the current object). This is indicated by block 336. Next, manifest accessing component 232 determines whether the manifest being processed is the most recent manifest (i.e., whether the manifest data 264 corresponds to the manifest currently being processed. This is indicated by block 338. If not, this would indicate that the job is trying to process a different manifest than resumability system 172 is tracking. Thus, the job is again deleted from the queue as indicated by block 332, and an appropriate notification or alert is sent, as indicated by block 334.

If, at block 338, it is determined that the manifest identified by resumability system 172 is the same manifest as that which is being operated on, then the overwrite/ignore controller 236 is set to "ignore". This is indicated by block 340. When the overwrite/ignore controller 236 is set to "overwrite", this means that when an object is selected for being imported, it is re-imported, in its entirety, so that it overwrites the previous object in the destination site to which it is being migrated. However, if it is set to "ignore", then the controller simply verifies that the object being operated on exists in the destination site, and it is not re-imported.

Resumability system 172 also sets the resumability timer component 250 so that resumability processing will be performed for every object that is imported. For instance, it may be that multiple objects were imported during the previous one minute interval set by the resumability timer component 250. Therefore, if the job failed during that interval, it is not known which particular object caused the failure. The resumability frequency is set to update with every object imported. This will enable the system to identify the precise object that caused the job failure, if it should fail again.

An example may be helpful. Assume that when a job runs, the system tries to import files 10-20 during a one minute interval, but the system crashes when it is attempting to import file 19. In that case, last object storage component 252 would only have recorded file 10 as the last object updated, since it only records that every minute. It would not know that the migration actually crashed on file 19. During the retry, the resumability frequency is set to happen with each object. Therefore, last object storage component will update the last object identifier 254 every time a new object is selected for import. If the migration crashes again on file 19, this will enable the system to precisely identify that file 19 was the file that was being processed when the system crashed. Setting the resumability frequency to happen with each object is indicated by block 342 in FIG. 4.

During the retry, all objects from the beginning of the manifest to the last object ID are processed with the overwrite/ignore controller 236 set to ignore. Thus, these objects will all be processed without re-importing any of them. This is because it is known that their import was successfully completed. This is indicated by block 346. When the last object ID that was recorded before the failure is reached in the manifest, the overwrite/ignore controller 236 is then set to "overwrite". This causes import component 234 to begin importing the object that has that object ID, in its entirety, overwriting the destination site. This is indicated by block 348.

Importing objects according to the manifest then continues as usual, performing resumability processing after every imported object, until the resumability time window has passed. Then, the resumability frequency is reset to occur on the timer interval. This is indicated by block 350.

Again, an example may be helpful. If, during the initial migration, the system attempted to import 10 files (files 10-20) during the one minute resumability timer interval, but the system crashed on file 19, then the system starts to re-import files, in their entirety, from the beginning of that timer interval (with file 10). It also updates the last object ID, with each file that is successfully migrated. However, after the timer interval has expired (e.g., after one minute), then this means that the file where the system crashed previously (file 19) has already been imported successfully. Therefore, the resumability timer can then be reset to perform resumability processing every minute, instead of after each object. In this way, any potentially bad object that resides within the last one minute interval (and corresponds to the previous crash) can be identified quickly if it continues to cause a failure, but the resumability processing need not occur so frequently, once that file has been successfully imported.

Processing then reverts back to block 318 where the manifest is accessed to identify a next object to import, and importing proceeds, as normal.

Figure 5:
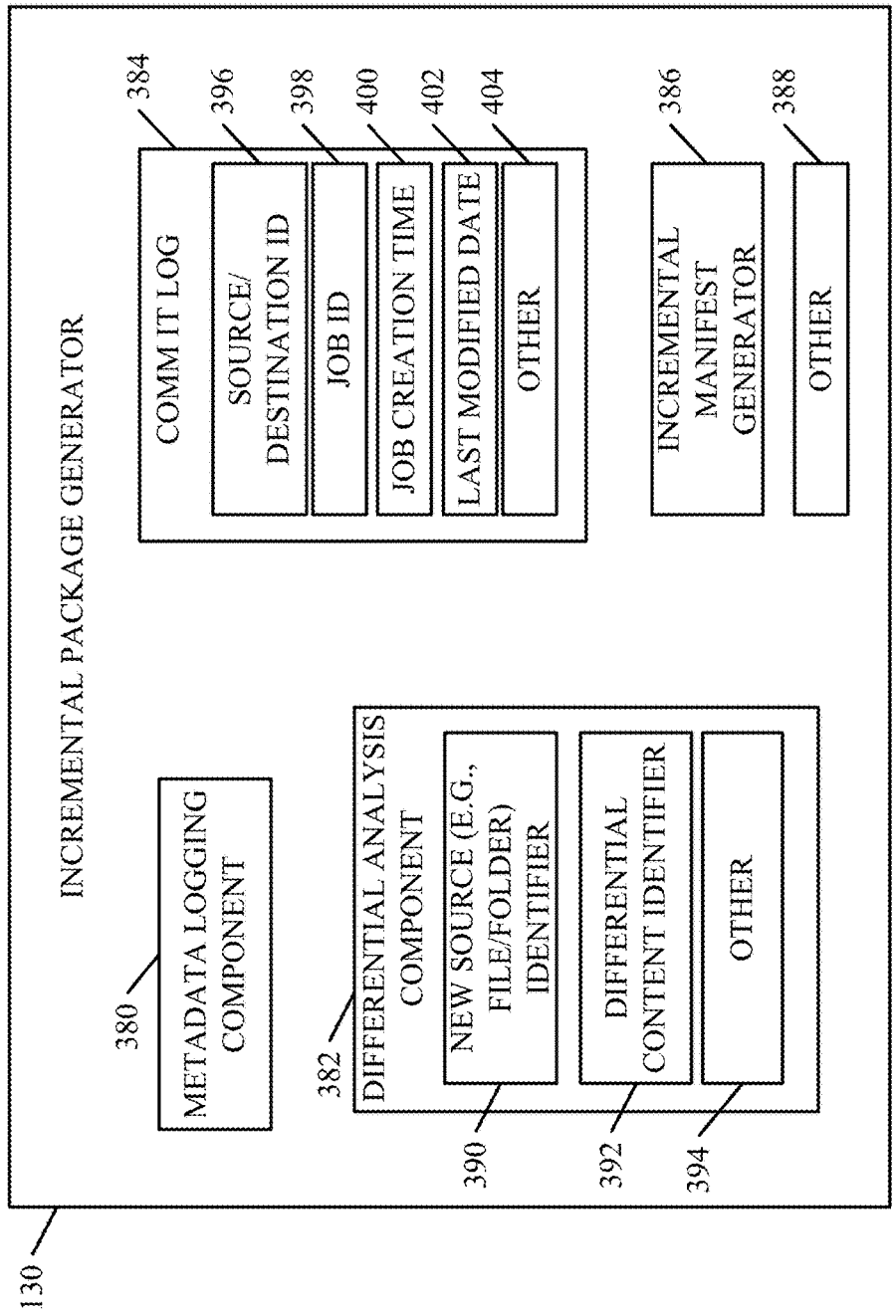
FIG. 5 is a block diagram of one example of an incremental package generator.
Figure 6:
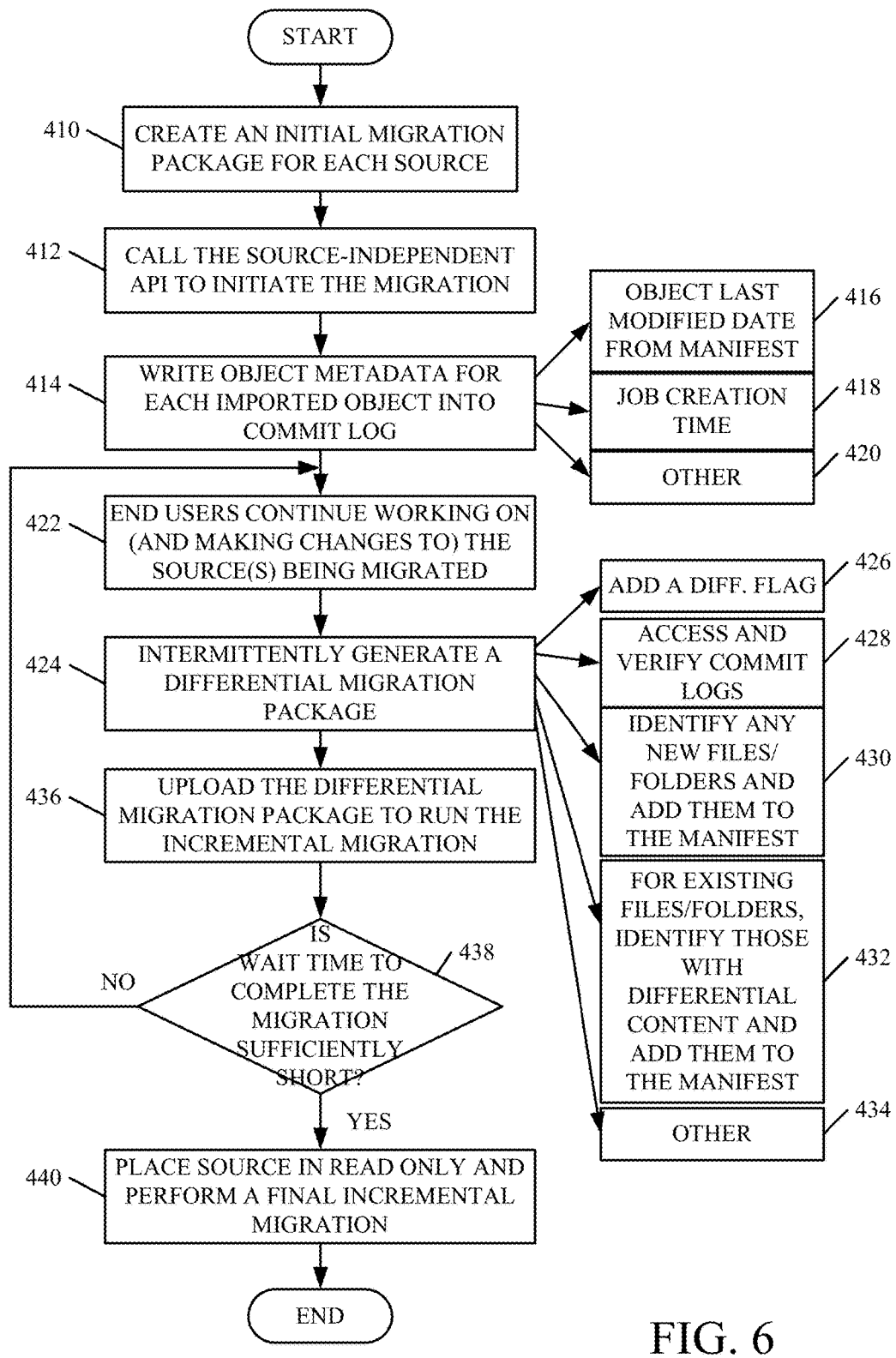
FIG. 6 is a flow diagram illustrating one example of the operation of the architecture shown in FIG. 1, in performing incremental migration.

FIG. 5 is a block diagram showing one example of incremental package generator 130 in more detail. FIG. 6 is a flow diagram illustrating one example of the operation of architecture 100, in performing incremental migration. There are several scenarios where incremental migration can be helpful. For instance, an organization may have a relatively large amount of data to be migrated. The amount of time needed to perform the migration may be several weeks. During the migration, the day-to-day activities of the end users is not to be affected, as the organization cannot afford multiple weeks of its computer system being down. The individuals may wish to be able to read and write their files, at their original location, as usual, even while the migration is being performed. Thus, by the end of the migration, there will be accumulated changes based upon the initially migrated files. At this point, the administrator illustratively uses incremental package generator 130 to initiate an incremental migration to update the destination sites with the latest changes.

Without any way of performing incremental migration, this second migration would also take several weeks. Therefore, there would potentially be no way to reach the final synchronized state between the on-premise sources 116 and the content destination sites 108, unless the organization is willing to have a relatively long down-time.

According to another scenario, it may be that the organization initiated a migration job with thousands of different files. The initial migration may have encountered unexpected failures for a fraction of those files, due to a packaging mistake made at the on-premise system. The organization may wish to retry migrating those files. Without incremental migration, the organization would need to resubmit the whole migration from scratch, or to craft a special manifest (or migration package) for only those files that failed. In accordance with one example, incremental package generator 130 automatically detects the differences between the data that was successfully migrated, and any changes to that data. This is described in greater detail with respect to FIGS. 5 and 6.

FIG. 5 shows that, in one example, incremental package generator 130 illustratively includes metadata logging component 380, differential analysis component 382, commit log 384, incremental manifest generator 386, and it can include other items 388. Differential analysis component 382 can include new source (e.g., file/folder) identifier 390, differential content identifier 392, and it can include other items 394. Commit log 384 illustratively includes a source/destination identifier 396, a job identifier 398, job creation time 400, a last modified date 402, and it can include other items 404. FIG. 6 is a flow diagram illustrating the operation of architecture 100 in performing incremental migration. FIGS. 5 and 6 will now be described in conjunction with one another.

It is first assumed that an initial migration package has been generated for each one of the content sources 116. This is indicated by block 410 in FIG. 6. Package upload component 132 then calls the source-independent API 142 to initiate the migration. This is indicated by block 412. Content migration system 104 then writes object metadata for each imported object into the commit log (which may be part of the manifest sent with the initial migration package 140). This is indicated by block 414. This information can include a date when the object was last modified from the manifest. This is indicated by block 416. It can include the time when a file was last modified (which can be included in the date), a job creation time 418 that identifies the time when the current job was created, and it can include other items 420.

During the initial migration, end users continue to work on (and make changes to) the sources 116 being migrated. This is indicated by block 422.

When the initial migration is complete (or otherwise intermittently) the administrator illustratively uses incremental package generator 130 to generate a differential (or incremental) migration package. This is indicated by block 424. The differential migration package illustratively includes a flag identifying it as such. This is indicated by block 426.

It illustratively accesses and verifies the commit logs as indicated by block 428. For instance, it can find and download all commit logs that include the identity of the source and destination. It can read the commit logs, one by one, and merge the content to make sure all the objects are unique.

It can then identify any new files or folders and add them to the manifest. This is indicated by block 430. For instance, it can enumerate the source file location to generate the differential manifest files. If the file or folder doesn't exist in original manifest, that means it is a new file or folder and it is added to the differential manifest. This is done by new source identifier 390.

Differential content identifier 392 also identifies whether existing files or folders have been modified, or have different content from those originally migrated, and it adds these files or folders (or other items of content) to the manifest as well. This is indicated by block 432. For instance, if the file or folder maps to the initial manifest, this means that it already existed at the time of the initial migration. However, if it has a newer last modified date identifier, this means that it has been modified since it was added to the initial manifest. Thus, it is added to the differential manifest. The differential migration package can be generated in other ways as well. This is indicated by block 434.

Package upload component 132 then uploads the differential migration package to run the incremental migration. This is indicated by block 436. This process continues, with the manifest and the differential data package becoming shorter and shorter, as incremental migrations are performed. Thus, the migration times will also become shorter and shorter, because fewer items of content need to be migrated. Thus, because this time is shorter, then end users will make fewer changes so the next differential migration will be shorter yet. This process continues until the time to complete the next incremental migration is sufficiently short that the administrator can place the content sources 116 in read only mode. This is indicated by block 438. At that point, a final incremental migration can be performed so that the content destination sites 108 are synchronized with the content sources 116, and the migration is complete. This is indicated by block 440.

The present system thus advantageously exposes an API that is independent of source. Therefore, migration packages can be generated according to that API regardless of the source of the data to be migrated. The migration package is then uploaded to intermediate storage on the cloud, so that internal cloud communication can be used to perform the ultimate migration. This increases the speed of the migration process. There is only a single (or very few) API call to initiate the migration and send the content to the cloud. Thus, repeated calls for each individual object, between the on-premise system and the cloud-based migration system, need not be made. This decreases network traffic and processing and memory overhead as well. The resumability system detects when an issue occurs and resumes where it stopped, instead of having to resubmit the entire job. In addition, because the intermediate, cloud-based storage system is used, the migration can be performed, in its final destination, without the need for customer initial storage to ever be needed. Access control specifications, per content item, are advantageously mapped between the source and target environments. Also the target environment can scale its resources based on the size of a given migration job. Export of content can also be done through the present system, allowing for archival, backup, or even analysis of content metadata.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
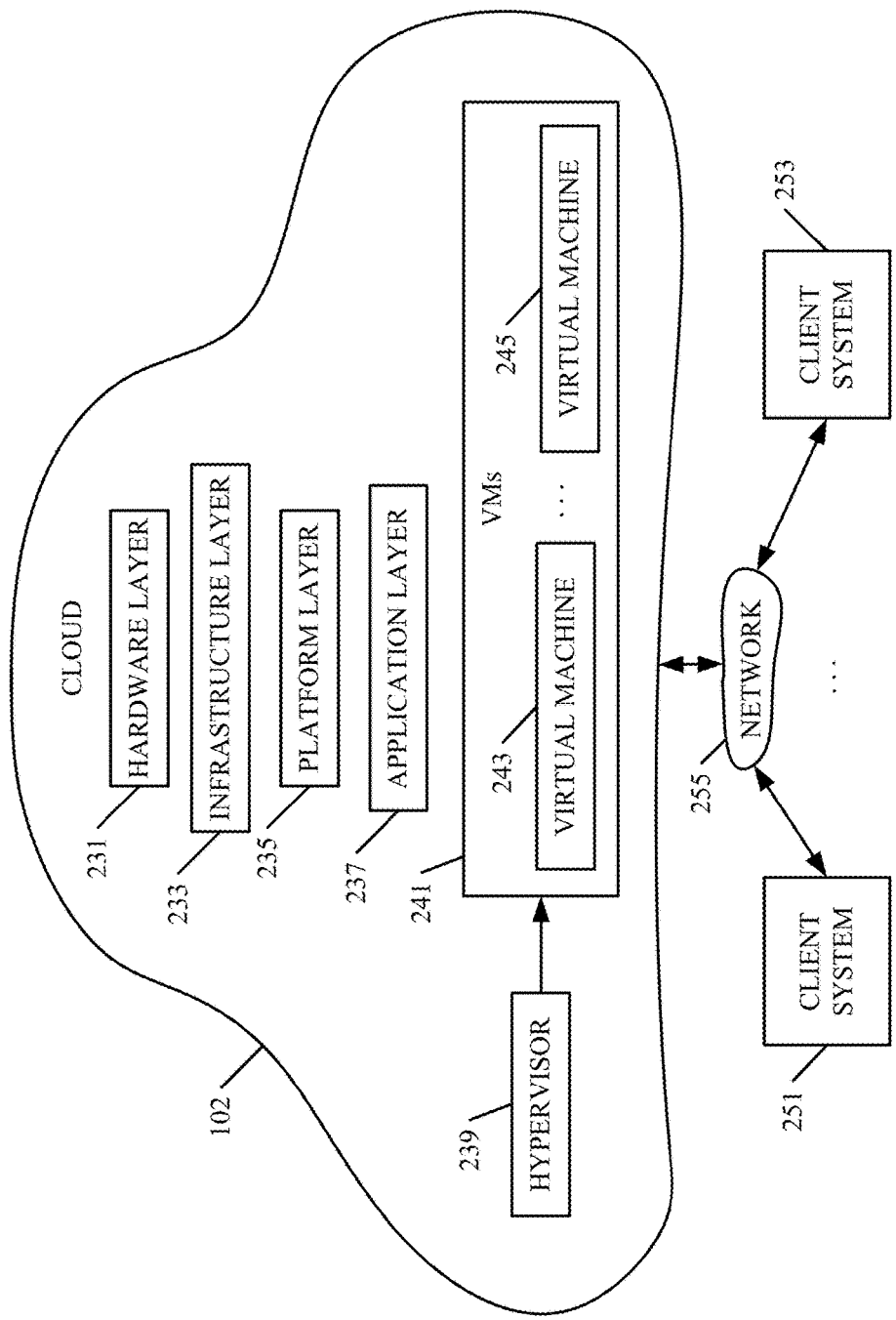
FIG. 7 is a block diagram showing different aspects of a computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 7 is a block diagram that describes other aspects of cloud 102, in more detail. It can be seen in FIG. 7 that cloud 102 (or each of the different premises on cloud 102) can include a hardware layer 231, an infrastructure layer 233, a platform layer 235, and an application layer 237. A hypervisor 239 can illustratively manage or supervise a set of virtual machines 241 that can include a plurality of different, independent, virtual machines 243-245. Each virtual machine can illustratively be an isolated software container that has an operating system and an application inside it. It is illustratively decoupled from its host server by hypervisor 239. In addition hypervisor 239 can spin up additional virtual machines 241, or close virtual machines 241, based upon workload or other processing criteria.

A plurality of different client systems 251-253 (which can be end user systems or administrator systems, or both) can illustratively access cloud 102 over a network 255. Depending upon the type of service being used by each of the client systems 251-253, cloud 101 may provide different levels of service. In one example, the users of the different client systems are provided access to application software and databases. The cloud service then manages the infrastructure and platforms that run the application. This can be referred to as software as a service (or SaaS). The software providers operate application software in application layer 237 and end users access the software through the different client systems 251-253.

The cloud provider can also use platform layer 233 to provide a platform as a service (PaaS). This involves an operating system, programming language execution environment, database and webserver being provided to the client systems 251-253, as a service, from the cloud provider. Application developers then normally develop and run software applications on that cloud platform and the cloud provider manages the underlying hardware and infrastructure and software layers.

The cloud provider can also use infrastructure layer 235 to provide infrastructure as a service (IaaS). In such a service, physical or virtual machines and other resources are provided by the cloud provider, as a service. These resources are provided, on-demand, by the IaaS cloud provider, from large pools installed in data centers. In order to deploy applications, the cloud users that use IaaS install operating-system images and application software on the cloud infrastructure.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
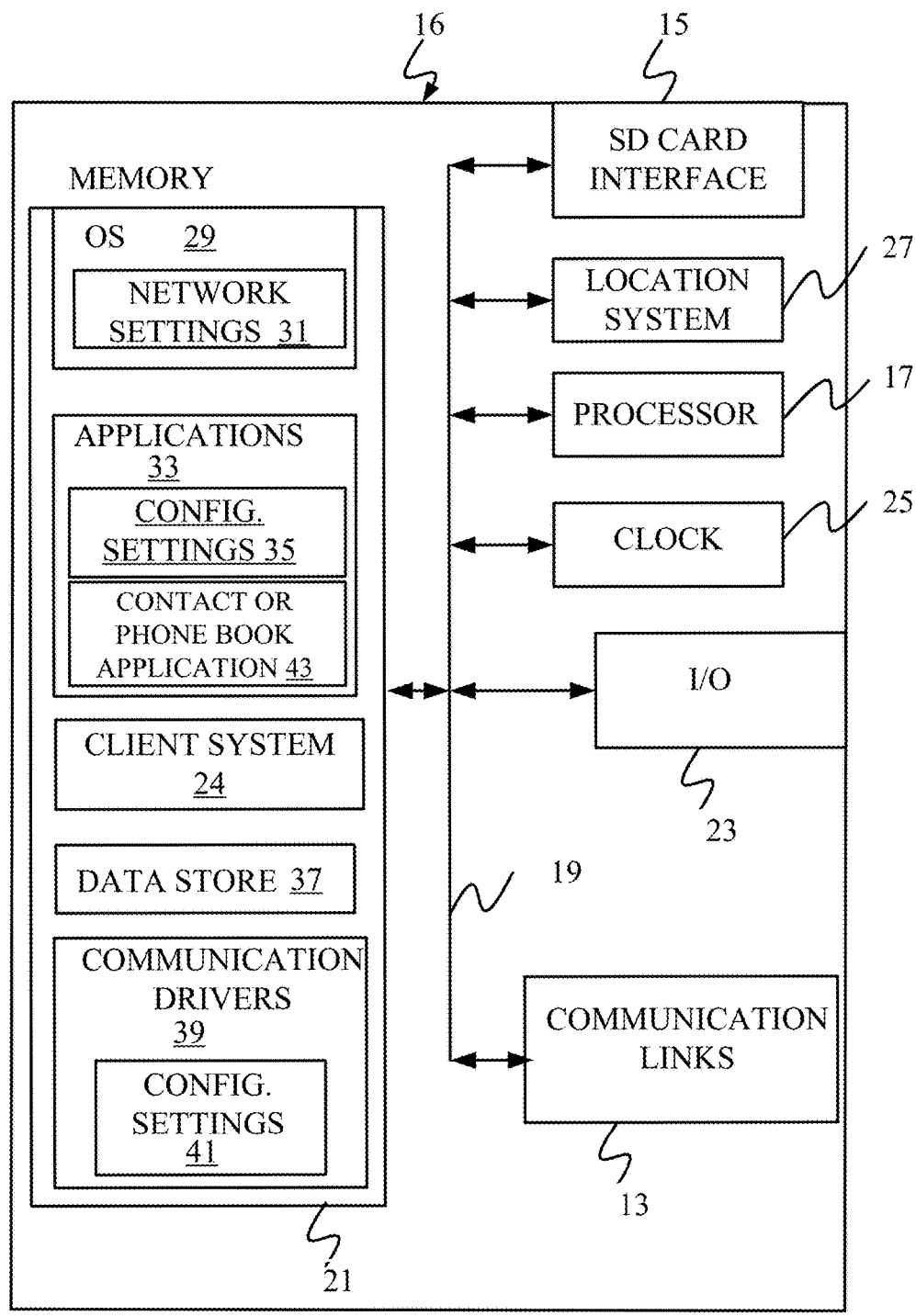
FIGS. 8-10 show examples of mobile devices that can be used in the architectures shown in previous figures.
Figure 9:
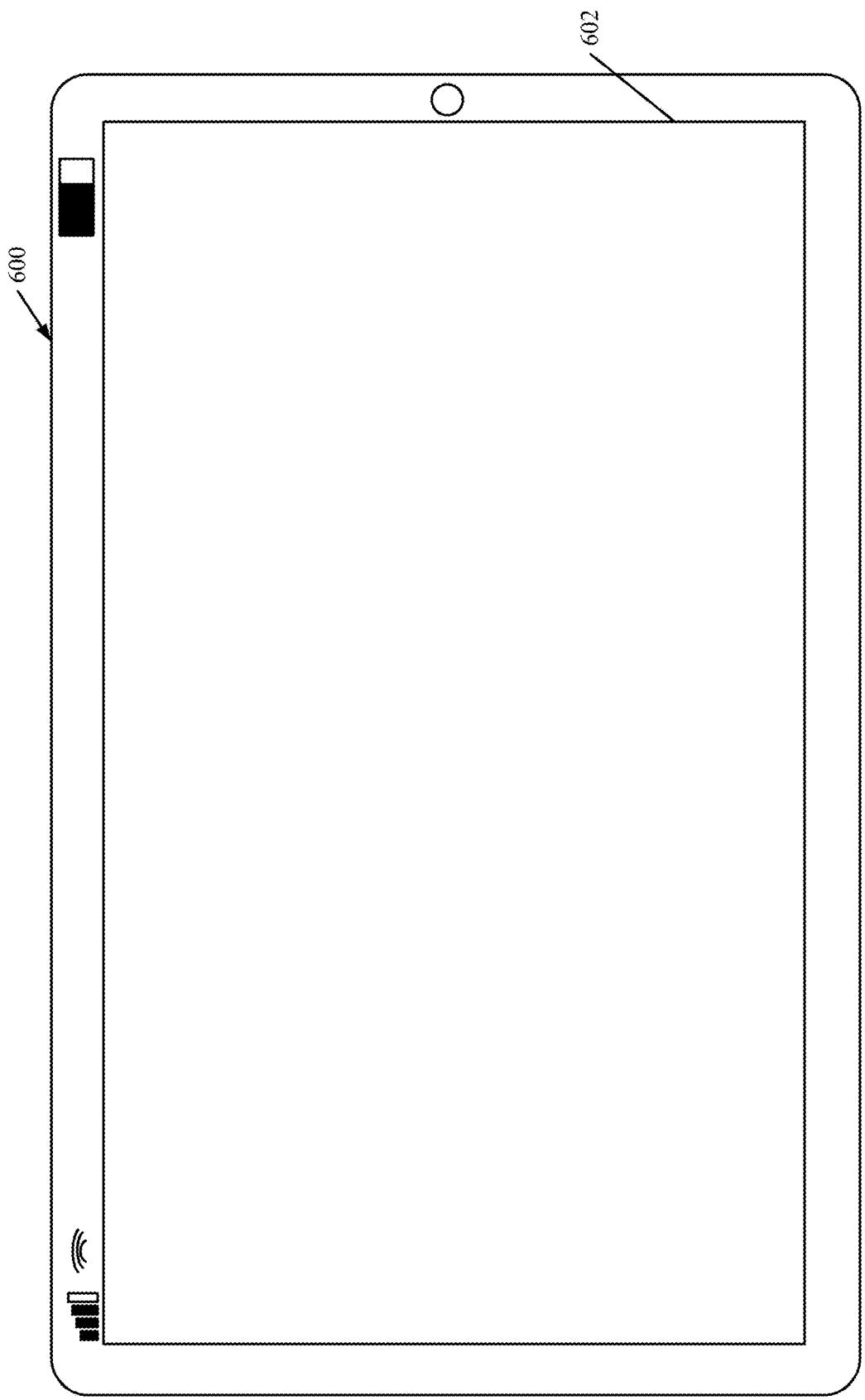
Figure 10:
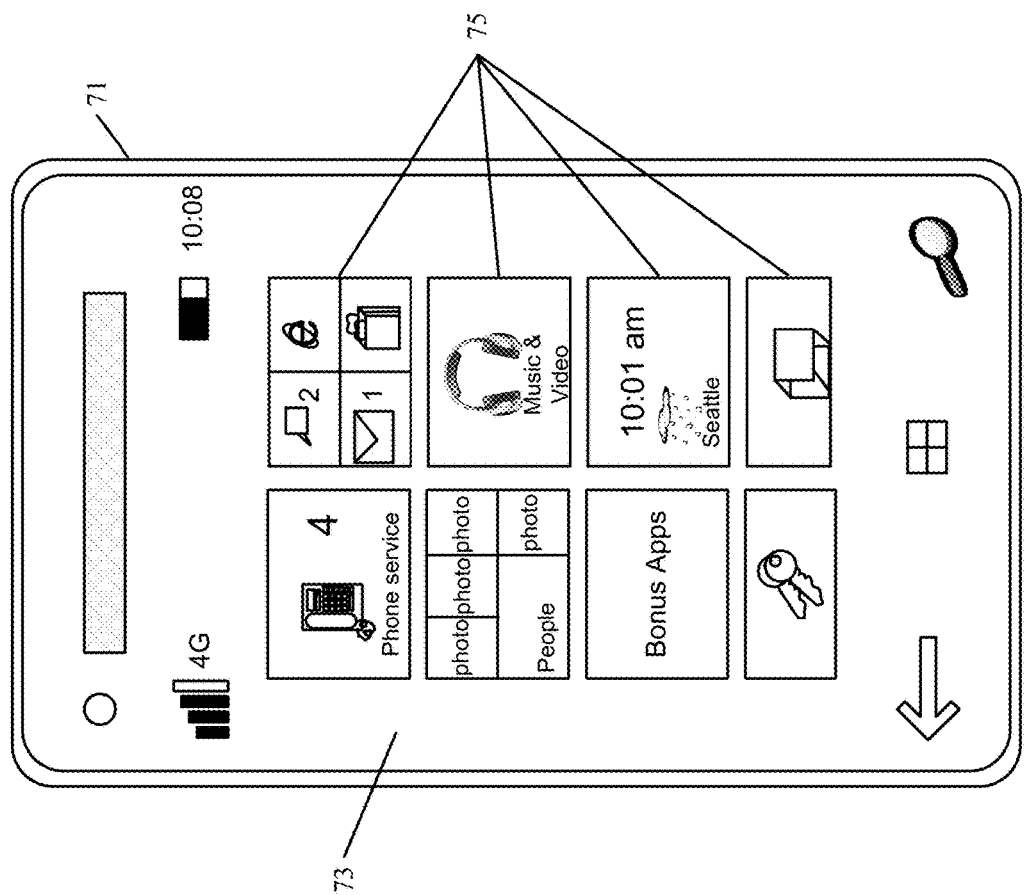

FIG. 8 is a simplified block diagram of one illustrative embodiment of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one example in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 that can be used as well. The device can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some embodiments, the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. Although not shown, the PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 10 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
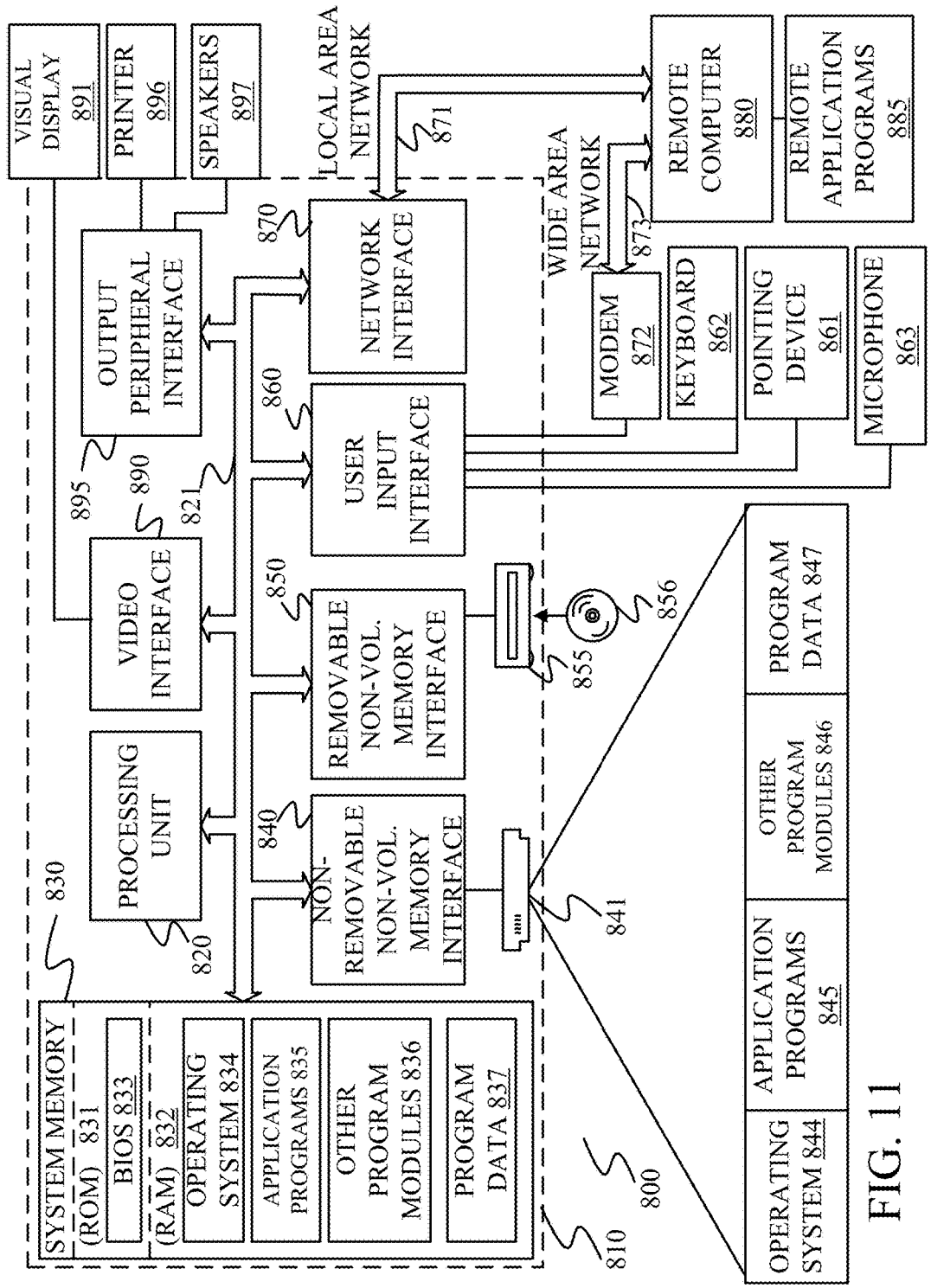
FIG. 11 is a block diagram of one example of a computing environment that can be used in the architectures shown in the previous figures.

FIG. 11 is one example of a computing environment in which architecture 100, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers from previous figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a migration queue system that exposes a source-independent application programming interface that is invoked by a migration request to migrate information from a source system to a destination system and that queues a work item corresponding to the migration request in a work item queue;
a manifest accessing component that accesses a manifest of the information to be migrated to identify content objects to be migrated; and
an import component that imports the identified content objects to be migrated to the destination system, the manifest accessing component placing a migration log in the manifest and updating the migration log to indicate content objects that are imported to the destination system.

Example 2 is the computing system of any or all previous examples and further comprising:
a number of virtual machines, controlled by the import component, to import the identified content objects.

Example 3 is the computing system of any or all previous examples and further comprising:
a bot thread controller that scales the number of virtual machines based on a number of work items in the work item queue.

Example 4 is the computing system of any or all previous examples and further comprising:
an intermediate storage system that receives, as part of the migration request from the source system, all content objects to be migrated from the source system to the destination system.

Example 5 is the computing system of any or all previous examples wherein the destination system comprises a cloud-based destination system and wherein the intermediate storage system comprises:
a cloud-based, binary large object (blob) store that stores the content objects as a binary large object.

Example 6 is the computing system of any or all previous examples and further comprising:
a resumability system that tracks content objects that are imported to the destination system and, when a migration failure is detected, resumes migration from a last-tracked content object.

Example 7 is the computing system of any or all previous examples wherein the manifest accessing component identifies the content objects to be migrated, to the import component, in a sequential order, based on object identifiers that identify the content objects in the manifest.

Example 8 is the computing system of any or all previous examples and further comprising:
an overwrite/ignore controller that controls the import component write a given identified object to the destination store, or to ignore the given identified object.

Example 9 is the computing system of any or all previous examples wherein the resumability system comprises:
a last object storage component that intermittently stores a last content object identifier for a last content object identified by the manifest accessing to be imported to the destination system.

Example 10 is the computing system of any or all previous examples wherein, when a migration failure is detected, manifest accessing component begins identifying the content objects to be migrated from a beginning of the sequential order and wherein the overwrite/ignore controller controls the import component to ignore all content objects identified in the sequential order prior to the last content object identified by the last content object identifier.

Example 11 is the computing system of any or all previous examples wherein, when the manifest accessing component identifies the last content object to the import component, the overwrite/import controller controls the import component to again begin writing the identified content objects to the destination system.

Example 12 is the computing system of any or all previous examples wherein, once the import component again begins writing the identified content objects to the destination system, the last object storage component stores a content object identifier for each identified content object, as it is identified by the manifest accessing system, as the last content object identifier.

Example 13 is the computing system of any or all previous examples wherein the last object storage component stores a content object identifier for each identified content object, as it is identified by the manifest accessing system, as the last content object identifier, for a resumability time period, after which the last object storage system resumes intermittently storing the last content object identifier for the content objects, as they are identified by the manifest accessing system.

Example 14 is a computing system, comprising:
a migration package creation system that generates a migration package, in a source-independent structure, for a source of content objects to be migrated from a source system to a destination system by writing the content objects to the source-independent structure and by writing a manifest, that includes object identifiers for the content objects, to the source-independent structure; and
a package upload component that calls a source-independent application programming interface on a cloud-based content migration system to upload the migration package to a cloud-based intermediate storage system.

Example 15 is the computing system of any or all previous examples wherein the migration package creation system comprises:

a metadata logging component that writes object metadata for the content objects to a commit log, the object metadata identifying a last time the content objects were written to the migration package.

Example 16 is the computing system of any or all previous examples wherein the migration package creation system comprises:

a new source identifier that identifies new content objects as objects that are added to the source system since the last time the content objects were written to the migration package; and a differential content identifier that identifies differential content as changes to the content objects made since the last time the content objects were written to the migration package.

Example 17 is the computing system of any or all previous examples wherein the migration package creation system comprises:

an incremental package generator that generates an incremental migration package with the new content objects and the differential content.

Example 18 is the computing system of any or all previous examples wherein the incremental package generator comprises:

an incremental manifest generator that generates an incremental manifest of the new content objects and the differential content and writes the incremental manifest to the incremental migration package.

Example 19 is a computer implemented method, comprising:

exposing a source-independent application programming interface that is invoked by a migration request to migrate information from a source system to a destination system;

queueing a work item corresponding to the migration request in a work item queue;

accessing a manifest of the information to be migrated;

identifying content objects to be migrated, from the manifest;

importing the identified content objects to be migrated to the destination system;

placing a migration log in the manifest; and updating the migration log to indicate content objects that are imported to the destination system.

Example 20 is the computer-implemented method of any or all previous examples and further comprising:

intermittently storing a last content object identifier identifying a last identified migrated;

when a migration failure is detected, begin identifying the content objects to be migrated from a beginning of a sequential order in the manifest;

ignoring all content objects identified in the sequential order prior to the last content object identified by the last content object identifier; and when the last content object is identified, again begin writing the identified content objects to the destination system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, configure the computing system to provide:
a migration queue system configured to:
expose a source-independent application programming interface that is invoked by a migration request to migrate information, stored in source data store of a source system, to a destination system that is remote from the source system; and
queue a work item corresponding to the migration request in a work item queue;
a manifest accessing component configured to:
access a manifest of the information to be migrated; and
based on the manifest, identify content objects, from the source data store of the source system, to be migrated to the destination system; and
an import component configured to:
import the identified content objects by storing the identified content objects to a destination data store in the destination system,
wherein the manifest accessing component is configured to:
update a migration log in the manifest, the updated migration log identifying that the content objects have been stored to the destination data store.

2. The computing system of claim 1 and further comprising:
a number of virtual machines, controlled by the import component, to import the identified content objects;
wherein the instructions, when executed, configure the computing system to provide:
a bot thread controller configured to scale the number of virtual machines based on a number of work items in the work item queue.

3. The computing system of claim 1, wherein
the migration queue system is configured to receive a migration package, that includes the manifest, in association with the migration request, the manifest identifying the information to be migrated from the source system to the destination system, and
the migration log identifies a completion status of the migration of each of the content objects.

4. The computing system of claim 1 wherein the instructions configure the computing system to provide:
an intermediate storage system configured to receive, as part of the migration request from the source system, all content objects to be migrated from the source system to the destination system;
wherein the import component is configured to import the data from the intermediate storage to the destination data store.

5. The computing system of claim 4 wherein the destination system comprises a cloud-based destination system and wherein the intermediate storage system comprises:
a cloud-based, binary large object (blob) store that stores the content objects as a binary large object.

6. The computing system of claim 1 wherein the instructions configure the computing system to provide:
a resumability system configured to track content objects that are imported to the destination system and, when a migration failure is detected, resume migration from a last-tracked content object.

7. The computing system of claim 6 wherein the manifest accessing component is configured to identify the content objects to be migrated, to the import component, in a sequential order, based on object identifiers that identify the content objects in the manifest.

8. The computing system of claim 7 wherein the instructions configure the computing system to provide:
an overwrite/ignore controller configured to control the import component to write a given identified object to the destination store, or to ignore the given identified object.

9. The computing system of claim 8 wherein the resumability system comprises:
a last object storage component configured to intermittently store a last content object identifier for a last content object identified by the manifest accessing component to be imported to the destination system.

10. The computing system of claim 9 wherein, when a migration failure is detected, the manifest accessing component is configured to begin identifying the content objects to be migrated from a beginning of the sequential order and wherein the overwrite/ignore controller is configured to control the import component to ignore all content objects identified in the sequential order prior to the last content object identified by the last content object identifier.

11. The computing system of claim 10 wherein, when the manifest accessing component identifies the last content object to the import component, the overwrite/import controller is configured to control the import component to again begin writing the identified content objects to the destination system.

12. The computing system of claim 11 wherein, once the import component again begins writing the identified content objects to the destination system, the last object storage component is configured to store a content object identifier for each identified content object, as it is identified by the manifest accessing system, as the last content object identifier.

13. The computing system of claim 12 wherein the last object storage component is configure to store a content object identifier for each identified content object, as it is identified by the manifest accessing system, as the last content object identifier, for a resumability time period, after which the last object storage system resumes intermittently storing the last content object identifier for the content objects, as they are identified by the manifest accessing system.

14. A computing system, comprising:
at least one processor; and
memory storing instructions executable by the at least one processor, wherein the instructions, when executed, configure the computing system to:
generate a migration package, in a source-independent structure, for a source of content objects to be migrated from a source system to a destination system by:
writing the content objects to the migration package in the source-independent structures; and
writing a manifest, that includes object identifiers that identify the content objects, to the migration package in the source-independent structure; and
call a source-independent application programming interface (API) on a cloud-based content migration system; and
use the source-independent API to upload the migration package, including the content objects and the manifest, to a cloud-based intermediate storage system that is remote from the source system and configured to transfer the content objects to the destination system.

15. The computing system of claim 14 wherein the migration package creation system comprises:
a metadata logging component configured to write object metadata for the content objects to a commit log, the object metadata identifying a last time the content objects were written to the migration package.

16. The computing system of claim 15 wherein the migration package creation system comprises:
a new source identifier configured to identify new content objects as objects that are added to the source system since the last time the content objects were written to the migration package; and
a differential content identifier configured to identify differential content as changes to the content objects made since the last time the content objects were written to the migration package.

17. The computing system of claim 16 wherein the migration package creation system comprises:
an incremental package generator configured to generate an incremental migration package with the new content objects and the differential content.

18. The computing system of claim 17 wherein the incremental package generator comprises:
an incremental manifest generator to generate an incremental manifest of the new content objects and the differential content and write the incremental manifest to the incremental migration package.

19. A computer implemented method, comprising:
exposing a source-independent application programming interface that is invoked by a migration request to migrate information, stored in a source data store of a source system, to a destination system that is remote from the source system, the migration request including a migration package that includes a manifest identifying the information to be migrated from the source system to the destination system;
queueing a work item corresponding to the migration request in a work item queue;
based on the manifest, identifying content objects, from the source data store of the source system, to be migrated to the destination system;
importing the identified content objects by storing the identified content objects to a destination data store in the destination system;
placing, in the manifest, a migration log that identifies a completion status of the migration of each of the content objects; and
updating a migration log in the manifest, the updated migration log identifying that the content objects have been stored to the destination data store.

20. The computer-implemented method of claim 19 and further comprising:
intermittently storing a last content object identifier identifying a last identified migrated;
when a migration failure is detected, begin identifying the content objects to be migrated from a beginning of a sequential order in the manifest;
ignoring all content objects identified in the sequential order prior to the last content object identified by the last content object identifier; and
when the last content object is identified, again begin writing the identified content objects to the destination system.

* * * * *